Patented Mar. 14, 1950

2,500,891

UNITED STATES PATENT OFFICE 2,500,891

PLASTICIZED VINYL RESIN COMPOSITIONS

Claude H. Alexander, Cuyahoga Falls, Ohio, assignor to The B. F. Goodrich Company, New York, N. Y., a corporation of New York No Drawing. Application August 22, 1947, Serial No. 770,183

1 Claim. (Cl. 260—31.8)

This invention relates to plasticized vinyl resin compositions. More particularly, the invention relates to plasticized polymers of vinyl chloride.

It is well known that hard and horny polymers such as those of vinyl chloride can be rendered soft, flexible, extensible and more or less rubber-like in character by the addition thereto at elevated temperatures of certain organic compounds known as plasticizers. However, the known plasticizers vary greatly in their compatibility with the resin, in their efficiency (amount necessary to produce a given plasticizing effect), and in their ability to be retained by the finished composition. In addition, the temperature necessary for mixing of the plasticizer with the polymer and for processing of the thermoplastic composition varies widely depending on the nature of the plasticizers, as does the physical and electrical properties of the composition produced.

Dialkyl phthalates have been used as plasticizers for polyvinyl chloride and have been found to be more valuable for this purpose than other types of materials. Di-2-ethylhexyl phthalate in particular has been found to be one of the most valuable polyvinyl chloride plasticizers, but it suffers from several disadvantages. Relatively high temperatures in the range of 265 to 280° F. are necessary to incorporate it in polyvinyl chloride and these high temperatures must be maintained during processing operations such as milling, calendering and extruding. Moreover, the finished composition is softer at normal room temperatures than is desired for many applications and it tends to lose its flexibility on continued service particularly in applications involving exposure to moderate heat.

Accordingly, it is an object of this invention to produce plasticized vinyl resin compositions requiring lower temperatures of milling and processing, having improved stability and flexibility in applications involving exposure to heat, and which will be tough, and hard at normal room temperatures.

I have discovered that dicyclohexyl phthalate, di-(cyclohexylmethyl) phthalate, and the various di-(methylcyclohexyl) phthalates are excellent plasticizers for vinyl chloride polymers and will impart a unique combination of properties thereto. In particular, I have found that these materials may be incorporated into polyvinyl chloride at relatively low temperatures to produce plasticized compositions which are smoothly workable in extrusion and molding operations at temperatures lower than has heretofore been possible, and which also are possessed of high flexibility over a wide range of temperatures with no observable cracking or "frosting" in the flexed area, yet are quite hard and tough at room temperatures. I have also found that the use of small amounts of these materials in conjunction with other plasticizers, particularly the dialkyl phthalates, will greatly aid processing by reducing milling temperature without lowering the hardness of the final composition.

The plasticizers of this invention are compatible with vinyl chloride polymers in any proportions, though for most applications when used as the sole plasticizer it is preferable that 25 to 100 parts by weight of the phthalate be used for each 100 parts of polymer. However, an important use of these plasticizing materials is in conjunction with other plasticizing materials to obtain lower processing temperatures and to obtain harder and more flexible compositions. For the latter use from 10 to 25 parts or more of the dicyclohexyl phthalate together with from 25 to 100 parts of the other plasticizer, di-2-ethylhexyl phthalate for example, will be found to produce resin compositions having highly desirable properties.

The vinyl resins which may be efficiently plasticized by the plasticizers of this invention are the polymers made by polymerizing a monomeric material comprising a vinyl halide such as vinyl chloride, vinyl bromide, vinyl iodide or vinyl fluoride, either alone or in admixture with other copolymerizable monomers such as vinylidene chloride, vinyl acetate, vinyl propionate, vinyl butyrate, methyl acrylate, ethyl acrylate, methyl methacrylate, methyl ethacrylate, diethyl monochloromaleate, cyclohexyl methacrylate, styrene, vinyl chlorobenzene, vinyl naphthalene, methyl vinyl ketone, dimethyl itaconate, diethyl fumarate, diethyl crotonate and others. The polymers preferred in this invention are those in which vinyl chloride is the major constituent.

The invention will be more specifically described by reference to certain specific examples illustrating certain preferred manners of carrying the invention into effect and illustrating results obtained with reference to certain preferred materials, though the invention is not to be construed as limited thereto.

EXAMPLES 1 TO 8

Dry polyvinyl chloride resin was placed on a two-roll plastic roll mill having heated rolls and the plasticizers shown in Table I were worked into the resin with mastication until a smooth plastic workable mass was obtained. Table I below presents the data relating to the proportions of resin and plasticizer and other materials, the temperature necessary for efficient milling, and other pertinent physical test data illustrating the desirable properties imparted to the plasticized resin.

truded shapes of polyvinyl chloride containing these alicyclic phthalates as plasticizers could be softened by immersing in hot water and subsequently swaged, shaped or spliced to form articles of novel properties. These same compositions also produced clear, colorless, rigid calendered or press polished sheets.

*Table I*

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Materials | Polyvinyl chloride | 100 | 100 | 100 | 100 | 100 | 100 | 100 | 100 |
| | Di-2-ethylhexyl phthalate | 50 | 26 | 39 | | 52 | 52 | 52 | 52 |
| | Di-cyclohexyl phthalate | | 26 | 13 | 50 | | 5 | 10 | 20 |
| | Basic Lead Carbonate | | | | | 10 | 10 | 10 | 10 |
| | Fine Clays | | | | | 7 | 7 | 7 | 7 |
| Properties of Composition | Milling Temperature °F | 265 | 245 | 255 | 245 | 265 | 265 | 260 | 245 |
| | Durometer A Hardness at 30° C | 84 | 94 | 88 | 100 | 83 | 86 | 86 | 90 |
| | Weight Loss (air oven 96 hrs. @ 212° F.) per cent | 5.0 | 4.0 | 4.5 | 3.8 | 5.0 | 5.0 | 4.6 | 4.8 |
| | Flexibility (after exposure to air oven 96 hrs. at 212° F.) | (¹) | (²) | (²) | (²) | (¹) | (¹) | (²) | (²) |

¹ Good.
² Excellent.

It will be noted that the polyvinyl chloride compositions containing di-cyclohexyl phthalate require milling temperatures from 5 to 20° F. lower than those containing di-2-ethylhexyl phthalate yet they are harder and possess lower heat loss and better flexibility than polyvinyl chloride plasticized with di-2-ethylhexyl phthalate. It is also to be noted that the compositions containing only small proportions of dicyclohexyl phthalate in addition to about 50 parts of di-2-ethylhexyl phthalate are harder and require lower milling temperatures than those not containing the dicyclohexyl phthalate. This is quite surprising and unexpected since ordinarily addition of increased amounts of plasticizers produces a softer composition.

EXAMPLE 9

A polyvinyl chloride composition was prepared as in Example 4 using 60 parts of di-2-(methylcyclohexyl) phthalate in place of the 50 parts of dicyclohexyl phthalate. A milling temperature of only 250° F. was required; the hardness of the resulting plasticized polyvinyl chloride was 100 (Durometer A at 30° C.), yet when bent or flexed, the sheet of plasticized resin generated a certain amount of heat in the zone of flexure which in turn greatly increased its flexibility. After continual flexing, the sheet of plasticized resin was cooled and it became rigid again with no observable cracking or frosting in the flexed area. Substantially identical results were secured when di-(cyclohexylmethyl) phthalate, di-(3-methylcyclohexyl) phthalate and di-(4-methylcyclohexyl) phthalate were substituted for the di-(2-methylcyclohexyl) phthalate.

EXAMPLE 10

The composition of Examples 2, 3, 4, 8 and 9 were granulated and used as extrusion compounds. In contrast with the polyvinyl chloride composition of Example 1 and polyvinyl chloride compositions containing other conventional plasticizing materials which require extrusion temperatures of 350° F., the extrusion compounds containing dicyclohexyl phthalate or di-(1-methylcyclohexyl) phthalate extruded smoothly at 325 to 330° F. and upon cooling were found to form extremely rigid monofilaments having high surface gloss. It was also found that ex-

EXAMPLE 11

Dicyclohexyl phthalate is particularly adaptable to the production of free-flowing, pulverulent, preplasticized resin compositions from the vinyl chloride polymers by the methods disclosed in the copending applications of Clarence E. Parks, Serial No. 745,120, filed April 30, 1947, and Willard F. Bixby, Serial No. 772,133, filed September 4, 1947, because it is a powdery solid. The method of Parks consists of heating and agitating a mixture of pulverulent resin and liquid or liquefiable plasticizer under conditions favoring complete absorption of plasticizer but below the softening or "gelatinizing" temperature of the resin so as to form a dry, friable pulverulent plasticized resin while that of Bixby consists of bringing a mixture of resin and plasticizer into contact with a rapidly moving stream of heated gas whereupon the resin absorbs the plasticizer and there is obtained a dry pulverulent plasticized resin. Since dicyclohexyl phthalate is a powdery solid it may be mixed with the dry pulverulent resin and when the mixture is heated the dicyclohexyl phthalate liquefies and is easily absorbed by the resin.

To illustrate such use of dicyclohexyl phthalate, a finely pulverulent polymer made by the polymerization in aqueous emulsion of a monomeric mixture of 92.5% vinyl chloride and 7.5% vinylidene chloride, was mixed with dicyclohexyl phthalate in the ratio of 50 parts by weight of plasticizer to 100 parts by weight of dry resin until a homogeneous blend of powdery materials was produced. The resin-plasticizer blend was placed in a jacketed ribbon blade internal mixer having its jacket maintained at 235 to 250° F. and the blend was mixed for a total of 30 minutes. The hot mix was discharged from the mixer and allowed to cool to return to room temperature. Upon examination of the cooled pulverulent resin it was found to be plasticized by the dicyclohexyl phthalate but still dry, non-rubbery and friable and free-flowing in character.

When 10 parts by weight of basic lead carbonate and 7 parts by weight of fine calcined clay were added to the dry, powdery plasticized resin of this example, the resulting pulverulent composition was an excellent extrusion compound for it extruded smoothly at 325 to 350° F. to form hard rigid monofilaments and wire and cable jackets which were extremely flexible and had excellent light and heat stability.

Compounding ingredients including reinforcing pigments, fillers, dyes and other coloring ingredients, and chemical stabilizers may be admixed with the plasticized resin compositions of this invention as is well understood in the art, or the plasticized resin compositions of this invention may be formulated as clear colorless, or colored translucent compositions, as illustrated in the specific examples. The alicyclic phthalates of this invention may be incorporated into thermoplastic vinyl chloride polymers by any of the methods well known to the art as by mill mixing, Banbury mixing or by internal mixers, or by the powder plasticization technique described in Example 11.

While I have disclosed certain preferred manners of performing my invention, I do not thereby desire or intend to limit myself solely thereto, for the precise proportions of the materials utilized may be varied and equivalent chemical materials may be employed, if desired, without departing from the spirit and scope of the invention as disclosed in the appended claim.

I claim:

A plasticized resin composition comprising 100 parts of polyvinyl chloride, 10 to 25 parts of dicyclohexyl phthalate and 25 to 100 parts of di-(2-ethylhexyl) phthalate.

CLAUDE H. ALEXANDER.

REFERENCES CITED

The following references are of record in the file of this patent:

UNITED STATES PATENTS

| Number | Name | Date |
|---|---|---|
| 2,339,387 | Endres | Jan. 18, 1944 |
| 2,349,413 | Hemperly | May 23, 1944 |

FOREIGN PATENTS

| Number | Country | Date |
|---|---|---|
| 546,690 | Germany | Mar. 14, 1932 |